US011644530B2

(12) United States Patent
Melzer et al.

(10) Patent No.: US 11,644,530 B2
(45) Date of Patent: May 9, 2023

(54) INTERFERENCE DETECTION IN RADAR RECEIVER MONITORING SYSTEMS

(71) Applicant: Infineon Technologies AG, Neubiberg (DE)

(72) Inventors: Alexander Melzer, Neutillmitsch (AT); Francesco Lombardo, Munich (DE)

(73) Assignee: Infineon Technologies AG, Neubiberg (DE)

( * ) Notice: Subject to any disclaimer, the term of this patent is extended or adjusted under 35 U.S.C. 154(b) by 288 days.

(21) Appl. No.: 17/061,840

(22) Filed: Oct. 2, 2020

(65) Prior Publication Data

US 2022/0107385 A1 Apr. 7, 2022

(51) Int. Cl.
*G01S 7/02* (2006.01)
*G01S 7/40* (2006.01)

(52) U.S. Cl.
CPC ............... *G01S 7/023* (2013.01); *G01S 7/40* (2013.01); *G01S 7/4056* (2013.01); *G01S 7/4069* (2021.05)

(58) Field of Classification Search
CPC .......... G01S 13/34; G01S 7/023; G01S 7/028; G01S 7/40; G01S 7/4056; G01S 7/4069
See application file for complete search history.

(56) References Cited

U.S. PATENT DOCUMENTS

| | | | |
|---|---|---|---|
| 2015/0009064 A1* | 1/2015 | Waldschmidt | ............ G01S 7/02 342/175 |
| 2016/0077196 A1* | 3/2016 | Dehlink | ............. G01R 31/2822 342/169 |
| 2019/0181964 A1* | 6/2019 | Christoffers | ........... H04B 17/19 |

* cited by examiner

*Primary Examiner* — Timothy X Pham
(74) *Attorney, Agent, or Firm* — Harrity & Harrity, LLP (57) ABSTRACT

A radio frequency (RF) circuit includes an input terminal configured to receive a reception signal from an antenna; an output terminal configured to output a digital output signal; a receive path including a mixer and an analog-to-digital converter (ADC), wherein the receive path is coupled to and between the input and output terminals, wherein the receive path includes an analog portion and a digital portion, and wherein the ADC generates a digital signal based on an analog signal received from the analog portion; a test signal generator configured to generate an analog test signal injected into the analog portion of the receive path; and a digital processor configured to receive a digital test signal from the digital portion, the digital test signal being derived from the analog test signal, analyze a frequency spectrum of the digital test signal, and determine a quality of the digital test signal.

23 Claims, 5 Drawing Sheets

INTERFERENCE DETECTION IN RADAR RECEIVER MONITORING SYSTEMS

BACKGROUND

Modern radar devices such as radar range and velocity sensors can be integrated in so-called monolithic microwave integrated circuits (MMICs). Radar sensors may be applied, for example, in the automotive sector, where they are used in so-called advanced driver assistance systems (ADAS) such as, for example, "adaptive cruise control" (ACC) or "radar cruise control" systems. Such systems may be used to automatically adjust the speed of an automobile so as to maintain a safe distance from other automobiles travelling ahead. However, RF circuits are also used in many other fields such as RF communication systems.

A radar MMIC (sometimes referred to as single chip radar) may incorporate all core functions of the RF frontend of a radar transceiver (e.g., local oscillator, power amplifiers, low-noise amplifiers (LNA), mixers, etc.), the analog pre-processing of the intermediate frequency (IF) or base band signals (e.g., filters, amplifiers, etc.), and the analog-to-digital conversion in one single package. The RF frontend usually includes multiple reception and transmission channels, particularly in applications in which beam steering techniques, phased antenna arrays, etc. are used. In radar applications, phased antenna arrays may be employed to sense the incidence angle of incoming RF radar signals (also referred to as "Direction of Arrival", DOA).

Reception (RX) monitoring is an operation executed by a radar MIMIC to ensure that all units involved in reception of radar signal are working as expected and the received radar data can be trusted for use. In particular, a monitoring sub-system can be used to observe key parameters and performance or health indicators, by means of specific measurements carried out on special test signals, which can highlight faults in the system so that appropriate action can be taken in such occurrences. One common circumstance in which monitoring sub-systems can become ineffective is the presence of interference during the monitoring measurement (e.g., during injection of the monitoring signal or test signal into the receive channel). In such case, interference may impact the result of the monitoring and be treated as a fault. This may result in part or the entire system being shut down, despite the possible interference being only a temporary event.

Therefore, an improved monitoring sub-system capable of detecting when a safety-critical monitoring measurement is affected by interference may be desirable.

SUMMARY

Embodiments provide a method for and a device for reception monitoring of a receive path of a radio frequency (RF) circuit.

Embodiments further provide a radio frequency (RF) circuit that includes an input terminal configured to receive a reception signal from an antenna; an output terminal configured to output a digital output signal; a receive path including a mixer and an analog-to-digital converter (ADC), wherein the receive path is coupled to and between the input terminal and the output terminal, wherein the receive path includes an analog portion and a digital portion, and wherein the ADC generates a digital signal based on an analog signal received from the analog portion; a test signal generator configured to generate an analog test signal that is injected into the analog portion of the receive path; and a digital processor configured to receive a digital test signal from the digital portion of the receive path, the digital test signal being derived from the analog test signal, analyze a frequency spectrum of the digital test signal, and determine a quality of the digital test signal.

Embodiments provide a method of performing reception monitoring in a radio frequency (RF) circuit. The method includes: generating a reference signal; generating an analog test signal that includes a constant frequency offset from the reference signal; injecting the analog test signal into an analog portion of a receive path; generating a mixer output signal based on the analog test signal coupled into the receive path and the reference signal, wherein the mixer output signal includes a test frequency equal to the constant frequency offset; converting the mixer output signal into a digital test signal; and analyzing a frequency spectrum of the digital test signal to determine a quality of the digital test signal.

BRIEF DESCRIPTION OF THE DRAWINGS

Embodiments are described herein making reference to the appended drawings.

DETAILED DESCRIPTION

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Each of the elements of the present disclosure may be configured by implementing dedicated hardware or a software program on a memory controlling a processor to perform the functions of any of the components or combinations thereof. Any of the components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLC), or other equivalent integrated or discrete logic circuitry.

Accordingly, the term "processor," as used herein refers to any of the foregoing structures or any other structure suitable for implementation of the techniques described herein. A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a digital signal processor (DSP) that performs some processing on the digital signal.

Embodiments are discussed below in the context of a radar system. It should be noted, however, that the described embodiments may also be applied in applications different from radar such as, for example, RF transceivers of RF communication devices.

Figure 1:
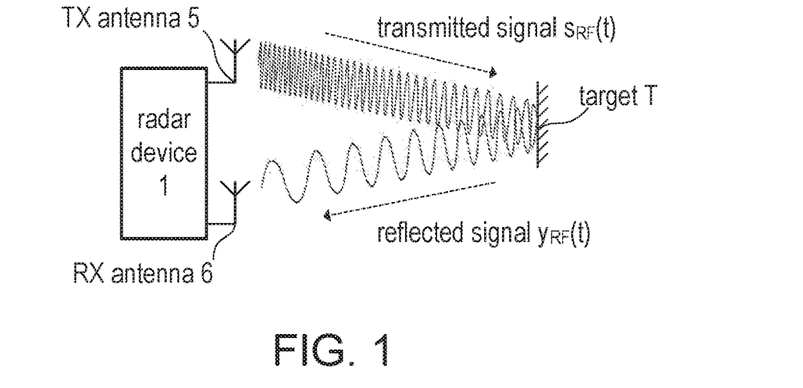
FIG. 1 is a drawing illustrating the operating principle of a frequency-modulated continuous-wave (FMCW) radar system for distance and/or velocity measurement.

FIG. 1 illustrates a frequency-modulated continuous-wave (FMCW) radar system 1. In the present example, separate transmission (TX) and reception (RX) antennas 5 and 6, respectively, are used. However, it is noted that a single antenna can be used so that the transmission antenna and the reception antenna are physically the same (monostatic radar configuration). It will be appreciated that "(t)" denotes an analog signal defined as a continuous wave that may change over a time period t, and "(k)" denotes a digital signal defined as a discrete wave, where k is an integer and may represent a kth digital sample or a digital signal containing k digital samples. A signal may be represented with or without its analog or digital domain identifier (t) and (k), respectively.

The transmission antenna continuously radiates an RF signal $S_{RF}(t)$, which is frequency-modulated, for example, by a periodic linear frequency ramp signal (also referred to as frequency sweep or chirp signal). The transmitted signal $S_{RF}(t)$ is back-scattered at a target T, which is located in the radar channel within the measurement range of the radar device. The back-scattered signal $y_{RF}(t)$ is received by the reception antenna 6. In the depicted example, the back-scattered signal is denoted as $y_{RF}(t)$.

Figure 2:
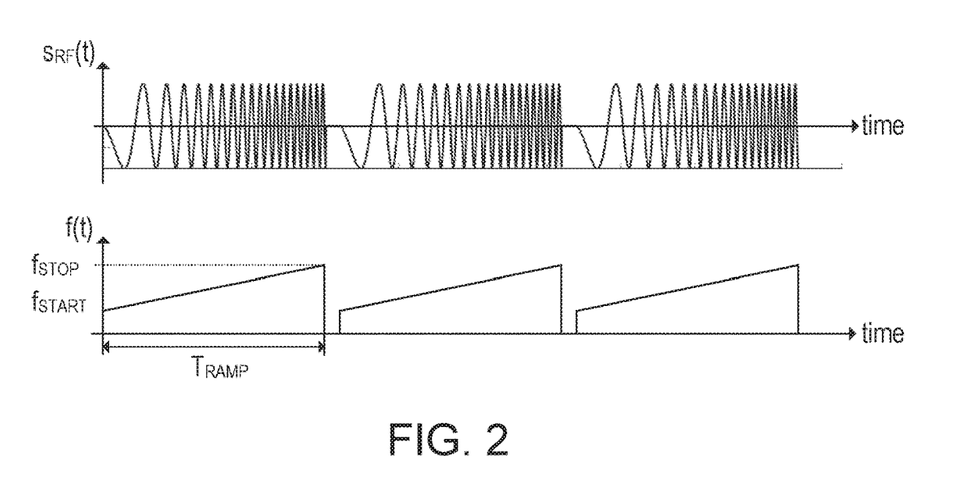
FIG. 2 includes two timing diagrams illustrating the frequency modulation of the radio frequency (RF) signal used in FMCW radar systems.

FIG. 2 illustrates the mentioned frequency-modulation of the signal $S_{RF}(t)$ according to one or more embodiments. As shown in FIG. 2, the signal $S_{RF}(t)$ may be composed of a series of "chirps", that is to say the signal $S_{RF}(t)$ comprises a sequence of sinusoidal signal profiles (waveforms) with rising frequency (up-chirp) or falling frequency (down-chirp). In the present example, the instantaneous frequency f(t) of a chirp increases linearly, starting at a start frequency $f_{START}$ to a stop frequency $f_{STOP}$ within a time interval $T_{RAMP}$. Such chirps are also referred to as linear frequency ramps. A plurality of ramps may make up a radar frame which may also be referred to as a radar operation cycle. For examples, a radar operation cycle may include several hundreds of radar ramps (sweeps) taking up to 10-30 ms in total. A frame length of the radar frame corresponds to one radar operation cycle. It is also to be noted that consecutive ramps have a short pause therebetween and a longer pause may be used between consecutive radar frames.

It will be appreciated that the start frequency $f_{START}$ and stop frequency $f_{STOP}$ of the ramps may be within a frequency band with minimum frequency Fmin and maximum frequency Fmax. As such, frequency Fmin and frequency Fmax define an operating frequency range or the frequency band usable for the ramping signals, and, thus, the frequency range or the frequency band of the radar application of the radar MMIC. In some embodiments, the frequency range defined by a single ramp having start and stop frequencies $f_{START}$ and $f_{STOP}$ may be smaller than the usable frequency band. However, all ramps that are generated during operation lie between the frequencies Fmin and Fmax of the radar band used for generating the ramping signals.

FIG. 2 illustrates three identical linear frequency ramps. It is noted, however, that the parameters $f_{START}$, $f_{STOP}$, $T_{RAMP}$ as well as the pause between the individual frequency ramps may vary dependent on the actual implementation and use of the radar device 1. In practice, the frequency variation may be, for example, linear (linear ramp, frequency ramp), exponential (exponential ramp), or hyperbolic (hyperbolic ramp). In some embodiments, the frequency may decrease instead of increase during time $T_{RAMP}$. Furthermore, in other embodiments the center frequency of each ramp (and therefore $f_{START}$ and $f_{STOP}$) may vary (e.g. from ramp to ramp or after detecting an interference) to allow using the full or a part of the frequency band. In one example, the frequency band has a minimum frequency Fmin of 76 GHz and a maximum frequency Fmax of 81 GHz.

Figure 3:
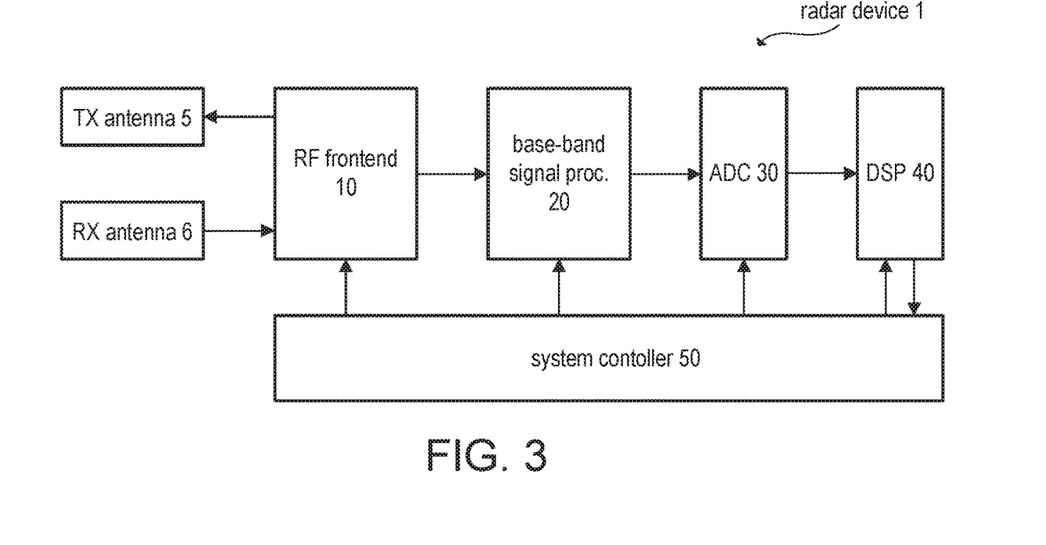
FIG. 3 is a block diagram illustrating the basic structure of an FMCW radar device.

FIG. 3 is a block diagram that illustrates an exemplary structure of a radar device 1 (radar sensor). It is noted that a similar structure may also be found in RF transceivers used in other applications such as, for example, in wireless communications systems. Accordingly, at least one transmission antenna 5 (TX antenna) and at least one reception antenna 6 (RX antenna) are connected to an RF frontend 10, which may be integrated in a monolithic microwave integrated circuit (MMIC).

The RF frontend 10 may include all the circuit components needed for RF signal processing. Such circuit components may (but need not necessarily) include, for example, a local oscillator (LO), RF power amplifiers, low noise amplifiers (LNAs), directional couplers such as rat-race-couplers and circulators, and mixers for the down-conversion of RF signals (e.g., the received signal $y_{RF}(t)$, see FIG. 1) into the base-band or an intermediate frequency (IF) band.

It is noted that antenna-arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several transmission (TX) and reception (RX) channels, which among others allows the measurement of the direction (direction of arrival (DoA)), from which the radar echoes are received.

In the case of a frequency-modulated continuous-wave (FMCW) radar system, the transmitted RF signals radiated by the TX antenna 5 are in the range between approximately 20 GHz and 100 GHz (e.g. in the frequency band 21 to 26 GHz or in the frequency band 76 to 81 GHz). As mentioned, the RF signal $y_{RF}(t)$ received by the RX antenna 6 includes the radar echoes, i.e., the signal back-scattered at the so-called radar targets.

The received RF signals $y_{RF}(t)$ are down-converted into the base band (IF band) and further processed in the base band using analog signal processing (see FIG. 3, base band signal processing chain 20), which basically includes filtering and amplification of the base-band signal. It will be appreciated that if the received RF signals are down-converted into the IF band, the base band signal processing chain 20 may be referred to as an IF signal processing chain. Thus, the analog base band signal processing chain 20, in general, may also be referred to as an analog signal processing chain 20.

The base-band signal is finally digitized using one or more analog-to-digital converters (ADC) 30 and further processed in the digital domain (see FIG. 3, digital signal processing chain implemented, e.g., in digital signal processor, DSP, 40). The RF frontend 10 and the analog base band signal processing chain 20 (and optionally the ADC 30) may be integrated in a single MMIC. However, in some applications, some components may also be distributed among two or more integrated circuits.

The overall system is controlled by a system controller 50, which may be at least partly implemented using a processor, such as a microcontroller executing appropriate firmware.

Figure 4:
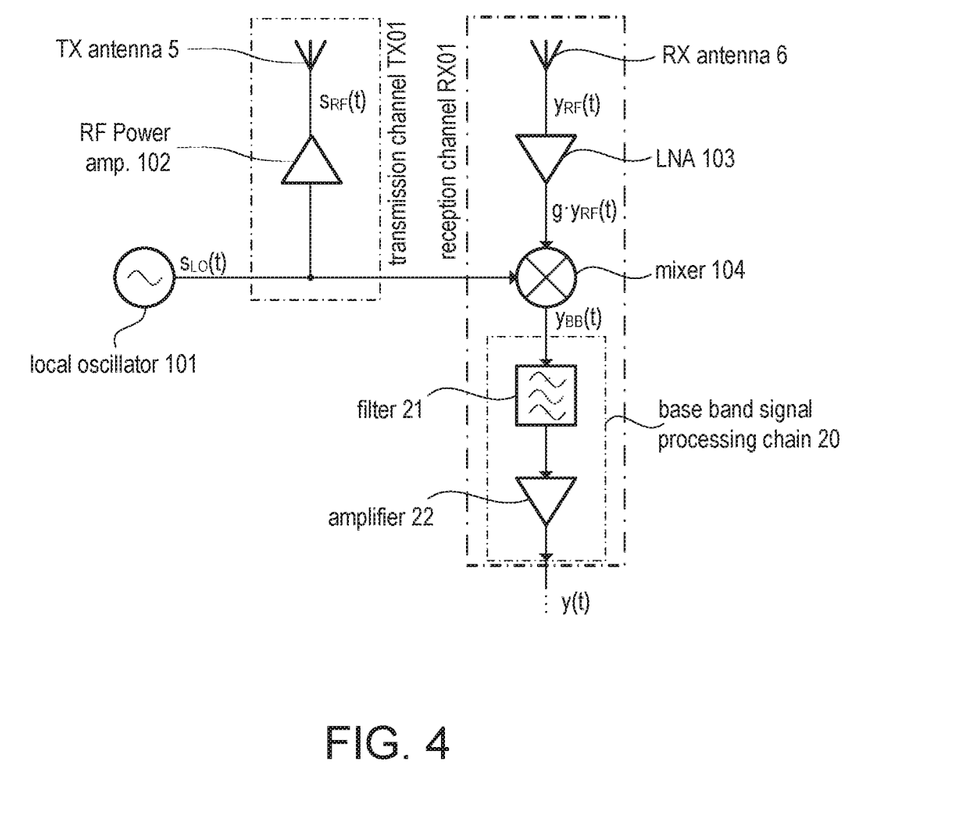
FIG. 4 is a circuit diagram illustrating one example of an analog RF frontend, which may be included in the FMCW radar device of FIG. 3.

FIG. 4 illustrates one exemplary implementation of the RF frontend 10, which may be included in the radar sensor shown in FIG. 3. It is noted that FIG. 4 is a simplified circuit diagram illustrating the basic structure of the RF frontend. Actual implementations, which may heavily depend on the application, are of course more complex and include several RX and/or TX channels. The RF frontend 10 includes a local oscillator (LO) 101 that generates an RF signal SLO(t), which may be frequency-modulated as explained above with reference to FIG. 2. The RF signal SLO(t) is also referred to as LO signal or a reference signal. In radar applications, the LO signal is usually in the SHF (Super High Frequency) or the EHF (Extremely High Frequency) band, e.g., between 76 GHz and 81 GHz in automotive applications. The LO signal may also be generated at a lower frequency and then up-converted using frequency multiplication units.

The LO signal SLO(t) is processed in the transmission signal path as well as in the receive path. The transmission signal $S_{RF}(t)$ (outgoing radar signal), which is radiated by the TX antenna 5, is generated by amplifying the LO signal $S_{LO}(t)$, e.g., using an RF power amplifier 102. The output of the amplifier 102 is coupled to the TX antenna 5. The received signal $y_{RF}(t)$ (incoming radar signal), which is provided by the RX antenna 6, is directed to a mixer 104, which may be an LNA mixer. In the present example, the received signal $y_{RF}(t)$ (i.e., the antenna signal) is pre-amplified by RF amplifier 103 (gain g), so that the mixer receives the amplified signal $g \cdot y_{RF}(t)$ at its RF input port.

The mixer 104 further receives the LO signal SLO(t) at its reference input port and is configured to down-convert the amplified signal $g \cdot y_{RF}(t)$ into the base band (IF band). In this case, it is converted into the base band and the resulting base-band signal at the mixer output is denoted as $y_{BB}(t)$. The base-band signal $y_{BB}(t)$ is further processed by the analog base band signal processing chain 20 (see also FIG. 3), which basically includes one or more filters (e.g., a band-pass 21) to remove undesired side bands and image frequencies as well as one or more amplifiers such as amplifier 22). The analog output signal, which may be supplied to an analog-to-digital converter (cf. FIG. 3), is denoted as y(t). Various techniques for the digital post-processing of the digitized output signals (digital radar signal) are as such known (e.g., Range Doppler Analysis) and thus not further explained herein.

In the present example, the mixer 104 down-converts the RF signal $g \cdot y_{RF}(t)$ (amplified antenna signal) into the base band. The respective base band signal (mixer output signal) is denoted by $y_{BB}(t)$. The down-conversion may be accomplished in a single stage (i.e., from the RF band into the base band) or via one or more intermediate stages. In view of the example of FIG. 4, it is clear that the quality of the radar measurement will heavily depend on the quality of the LO signal $S_{LO}(t)$. Low phase noise, as well as steep and highly linear frequency ramps, are desired properties of the LO signal $S_{LO}(t)$.

Figure 5:
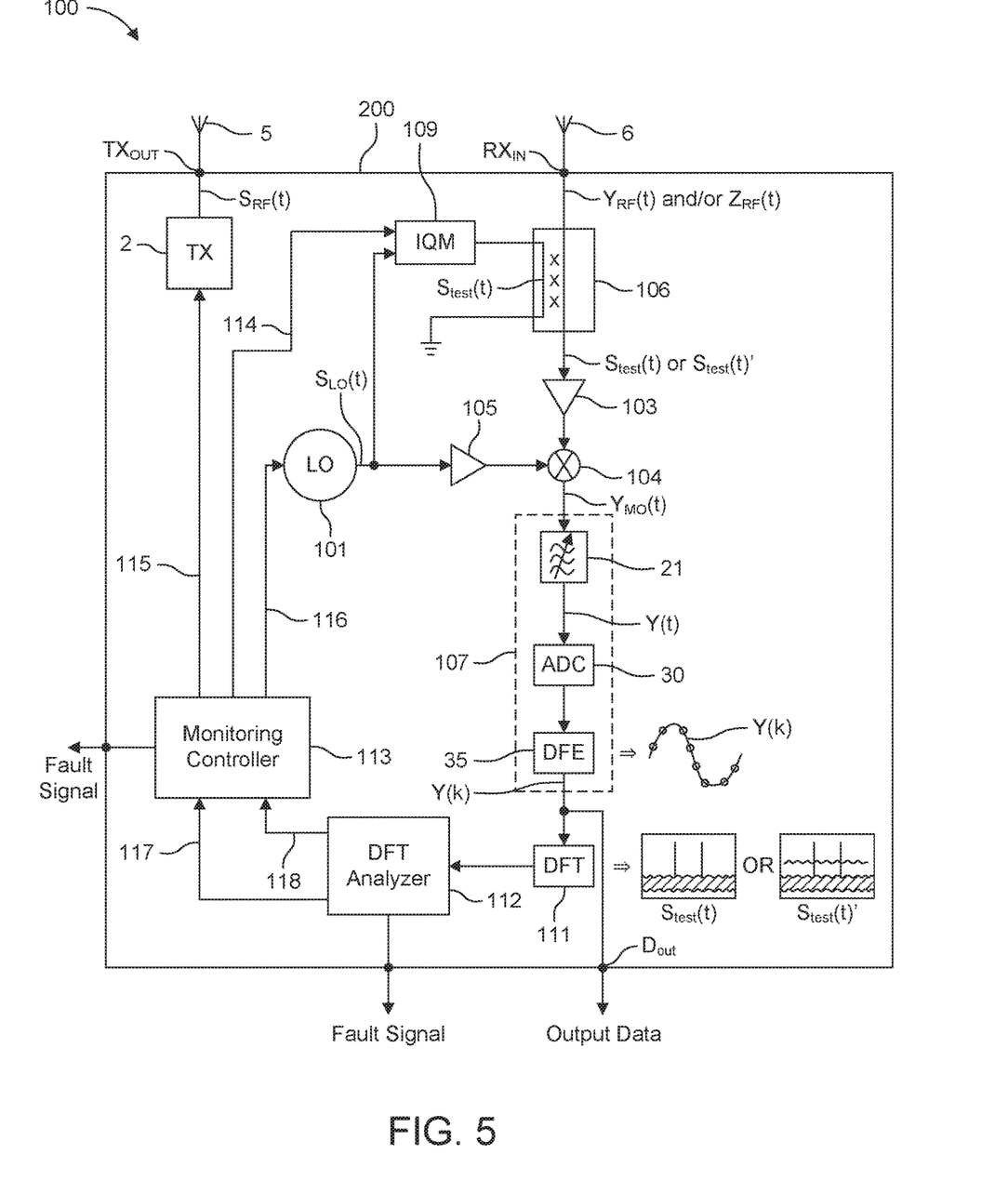
FIG. 5 is a schematic block diagram of a radar circuit according to one or more embodiments.

Embodiments relate generally to RX monitoring of a receive path of a radar circuit (e.g., a radar MMIC). FIG. 5 shows a schematic block diagram of a radar circuit 100 according to one or more embodiments. The RX monitoring is executed outside (i.e., before, after, or between) of receiving regular radar operation frames and takes several milliseconds to complete, during which regular radar operation is not operable. In other words, RX monitoring is performed while the transmitter TX is disabled or not transmitting radar signals and, as a result, the receiver of the radar MMIC does not receive radar signals (i.e., radar echoes) originating from the radar MMIC 200.

During RX monitoring an RX monitoring signal or test signal is injected into a selected reception (RX) channel (i.e., receive path) and evaluated. The monitoring subsystem performs specific measurements on the RX monitoring signal to detect faults or defective operation. In a radar receiver, the RX monitoring signal is an RF signal that is injected at the RF receive port RXIN (i.e., at the input of the selected RX channel) to monitor the functionality of the selected RX channel. A coupler 106 is used to inject the RX monitoring signal into the selected RX channel. However, in contrast to frequency-modulated radar signals that are transmitted and received during normal radar operation that comprise chirps (i.e., frequency ramps during which the frequency continuously changes), the RX monitoring signal during test mode or monitoring mode has a constant frequency.

The RX monitoring signal is an RF continuous-wave signal derived from a phase-locked loop (PLL) of the radar MIMIC (e.g., from the local oscillator 101) and has a constant frequency. The RF continuous-wave signal is the LO signal $S_{LO}(t)$ that gets frequency modulated by an IQ modulator (IQM) with a pre-defined offset frequency before it is fed to the coupler at the RX port RXIN. Thus, after down conversion by mixer 104 to the base band, a sinusoidal signal with exactly this offset frequency is observed and monitored. The signal processing is done from the filtered output signal y(t) of the mixer 104 in digital domain after sampling with an ADC.

The RX antenna 6 is not disabled or disconnected from the RX channel. Thus, it is capable of receiving signals, including interfering signals, during monitoring and testing of the RX channel. As a result, the RX channel is susceptible to interference, for example, from other radar systems that are transmitting radar signals. An interfering signal may be received at the RX antenna 6 and thus received at the RX channel. Because the RX monitoring signal is injected at the RF receive port RXIN, the interfering signal may be combined with the RX monitoring signal at the coupler 106 such that the interfering signal is superimposed onto the RX monitoring signal. Thus, in case any interfering signal is picked up at the RX antenna 6, the monitoring of the RX channel may be falsified or corrupted, leading to unreliable test results.

Figure 6A:
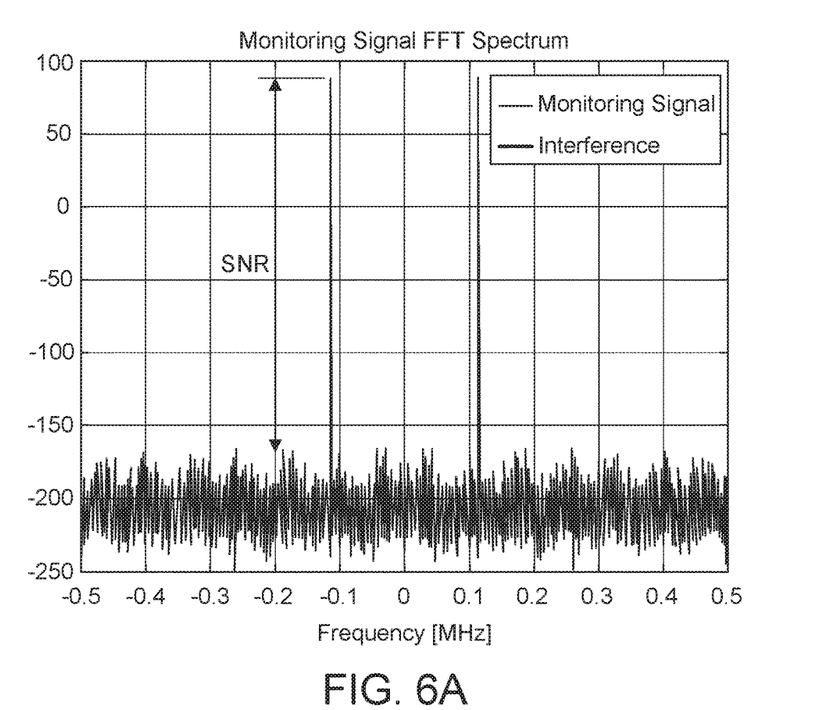
FIG. 6A shows an FFT spectrum of an RX monitoring signal without interference according to one or more embodiments.
Figure 6B:
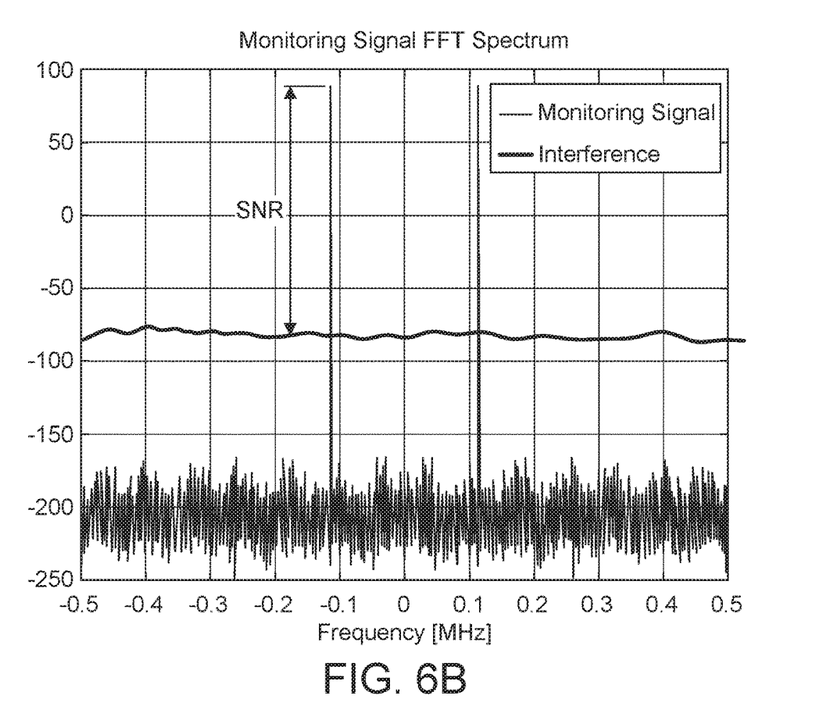
FIG. 6B shows an FFT spectrum of an RX monitoring signal with interference according to one or more embodiments.
Figure 6C:
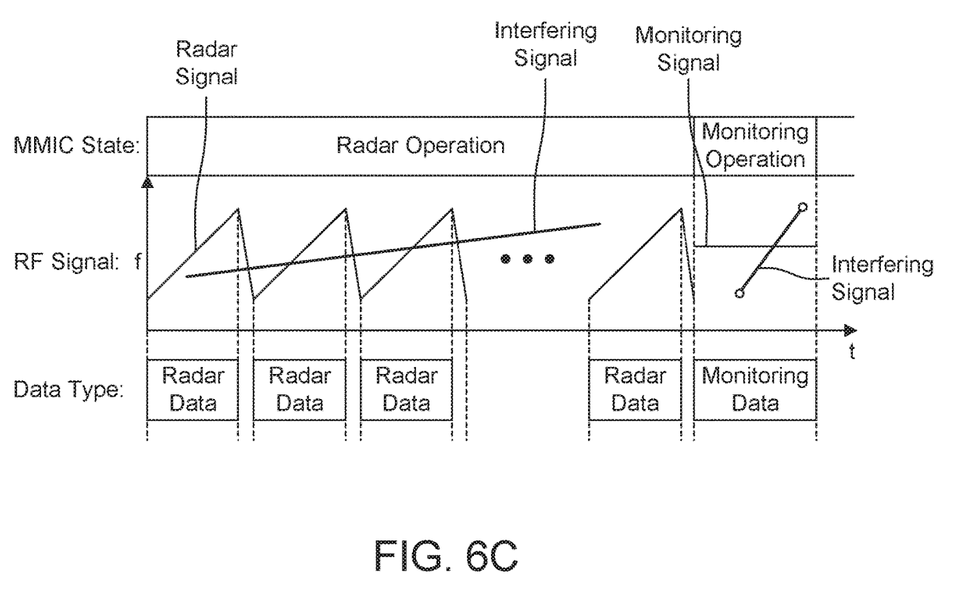
FIG. 6C shows a signal diagram according to a radar operation and a monitoring operation with interference according to one or more embodiments.

FIG. 6A shows an FFT spectrum of an RX monitoring signal without interference according to one or more embodiments. In contrast, FIG. 6B shows an FFT spectrum of an RX monitoring signal with interference according to one or more embodiments. As can be seen in FIG. 6B, the spectrum of the interference is superimposed and raises the noise floor, thereby decreasing the signal-to-noise ratio (SNR). FIG. 6C shows a signal diagram according to a radar operation and a monitoring operation with interference according to one or more embodiments. The signal diagram in FIG. 6C shows a radar signal received over time (t) during a radar operation from which radar data is generated and an RX monitoring signal generated during a monitoring operation from which monitoring data is generated. As can be seen, the frequency (f) of the radar signal varies with a series of chirps, whereas the frequency of the RX monitoring signal remains constant. The interfering radar signal crossed the entire IF bandwidth of the RX monitoring signal.

In particular, an interfering radar signal during the monitoring phase is typically a broadband signal. That is, since radar systems transmitting radar signals transmit chirps, an interfering radar signal would be a chirp that crosses the intermediate frequency (IF) bandwidth of the radar MMIC. Thus, in the RX monitoring signal (i.e., an IF signal) during the monitoring, the interferer power is spread over the whole IF bandwidth. Furthermore, the interfering power is expected to be strong in general.

FIG. 6A shows a double-sided monitoring signal spectrum. It shows the expected tone of the monitoring signal at around 0.12 MHz. There, no interference is present. As is indicated in the drawing, the full SNR as provided by the radar system is obtained.

In FIG. 6B, the occurrence of interference is shown with an interfering line. As mentioned, it is most likely that the interference signal is broadband across the whole IF signal spectrum. Thus, the SNR for the detection of the monitoring signal is reduced. Depending on the strength of the interfering signal, the monitoring may be completely falsified.

Turning back to FIG. 5, the radar circuit 100 comprises a TX antenna 5, an RX antenna 6, and a radar MIMIC 200 coupled to the TX antenna 5 and the RX antenna 6. The radar MMIC comprises the RF frontend 10, the analog signal processing chain 20, and the ADC 30 shown in FIG. 3, as well as additional monitoring circuitry. The output (i.e., output data) of the radar circuit 100 is provided to DSP 40 (see FIG. 2) for processing of received radar data via digital data output terminal $D_{OUT}$.

The TX antenna 5 is configured to transmit radar signal having a series of frequency chirps. The RX antenna 6 is configured to receive RF signal $y_{RF}(t)$ (i.e., an incoming radar signal), as described above. The RX antenna 6 may also receive an interfering signal $z_{RF}(t)$. It will be assumed that during a monitoring operation the RF signal $y_{RF}(t)$ is not received since the transmitter (TX) 2 is disabled from transmitting RF signal $S_{RF}(t)$. Thus, the processing of the RF signal $y_{RF}(t)$ through the reception channel will not be discussed.

The radar MMIC 200 includes an IQM 109 that generates the RX monitoring signal $S_{Test}(t)$ as a test signal. The radar MIMIC 200 also includes a directional coupler 106 that injects the RX monitoring signal $S_{Test}(t)$ into the RF part of the receive path between the reception input terminal RXIN and the mixer 104 during a reception channel monitoring operation.

The radar MMIC 200 further includes a PLL that includes the local oscillator 101 that generates a LO signal $S_{LO}(t)$, as described above. The radar MIMIC 200 also includes RF mixer 104, to which the LO signal $S_{LO}(t)$ is transmitted by the local oscillator 101. Thus, the mixer 104 receives the LO signal $S_{LO}(t)$, which may be pre-amplified by RF amplifier 105. The mixer 104 is configured to also receive the RX monitoring signal $S_{Test}(t)$, which may be pre-amplified by RF amplifier 103. In the case where the interfering signal $z_{RF}(t)$ is received during a monitoring operation and superimposed onto the RX monitoring signal $S_{Test}(t)$, the signal received by the mixer 104 may be indicated as $S_{Test}(t)'$.

For the monitoring operation, the IQM 109 is enabled and is configured to generate the RX monitoring signal $S_{Test}(t)$ using the LO signal $S_{LO}(t)$. In particular, the IQM 109 applies a predetermined offset frequency to the LO signal $S_{LO}(t)$ so that the RX monitoring signal $S_{Test}(t)$ is shifted in frequency from the LO signal $S_{LO}(t)$ by the predetermined offset frequency.

The mixer 104 is further configured to down-convert the RX monitoring signal $S_{Test}(t)$ or the interfered monitoring signal $S_{Test}(t)'$ into a down-converted signal using the LO signal $S_{LO}(t)$. The mixer 104 generates a mixer output signal $y_{MO}(t)$ as the down-converted signal, where the mixer output signal $y_{MO}(t)$ is a sinusoidal signal that has a frequency equal to the predetermined offset frequency applied by the IQM 109. Thus, the mixer output signal has a frequency equal to the frequency offset of the RX monitoring signal $S_{Test}(t)$ compared to the frequency of the LO signal $S_{LO}(t)$.

The frequency components included in the signal received by the mixer 104 from the directional coupler 106 may change depending on whether or not the interfering signal $z_{RF}(t)$ is superimposed onto the RX monitoring signal $S_{Test}(t)$, thereby affecting whether the mixer output signal $y_{MO}(t)$ includes an IF signal attributed to the test signal alone, or additionally includes frequency components from an interfering signal $z_{RF}(t)$.

The mixer output signal $y_{MO}(t)$ generated by mixer 104 may be a single tone signal that has a single intermediate frequency equal to the difference in frequencies (i.e., equal to the frequency offset). For example, the frequency offset may be 1 MHz, but is not limited thereto as this merely serves as one example. This frequency offset may be referred to as a test offset frequency Foffset.

The mixer output signal $y_{MO}(t)$ is further processed by a front end signal processing circuit 107, that includes an analog front end (AFE) circuit (e.g., analog signal processing chain 20), an ADC, and a digital front end (DFE) circuit that are sequentially arranged along the receive path of the radar MMIC 200. The receive path of the radar MMIC 200 is an RX signal chain defined by the path between a reception input terminal RX IN and a digital data output terminal $D_{OUT}$, with the mixer 104 and the front end signal processing circuit 107 arranged along the receive path.

The front end signal processing circuit 107 includes the band-pass filter 21 that receives the mixer output signal $y_{MO}(t)$ and outputs an analog baseband signal Y(t) to an ADC 30. The ADC 30 is configured to sample the mixer output signal analog baseband signal Y(t) and provide a sequence of sampled values to the DFE circuit 35. The sequence of sampled values is taken over one period. The DFE circuit 35 receives the ADC sampled values and generates a digital signal Y(k), and, more specifically, a discrete sinusoidal signal comprising the ADC sampled values.

The front end signal processing circuit 107 produces a digital signal Y(k) that is digital data (i.e., digital samples) representative of the test data received in the RX monitoring signal $S_{Test}(t)$.

It is noted that during a radar operation, the digital signal Y(k) is representative of the radar data received in the RF signal $y_{RF}(t)$ and is further output from the digital data output terminal $D_{OUT}$ as a digital output signal, and provided to a DSP that is external to the MMIC 200 (e.g., DSP 40).

For performing RX monitoring, the MMIC 200 includes the IQM 109, a DSP 111 that includes a discrete Fourier transform (DFT) module, engine, or any other module implementing frequency analysis of input data, a DFT spectrum analyzer 112, and a monitoring controller 113. The DFT spectrum analyzer 112 may be a processor integrated as part of the DSP 111, but is shown as a separate unit for the purposes of explanation. Together, the DSP 111 and the DFT spectrum analyzer 112 have the capabilities of generating and analyzing a frequency spectrum of the digital signal Y(k) that includes the test data.

In some embodiments, the DSP 111 may apply a fast Fourier transform (FFT) to the digital signal Y(k) as one type of DFT to generate the frequency spectrum. The DFT spectrum analyzer 112, in turn, may be configured to analyze the FFT spectrum. Thus, it is contemplated that any type of DFT can be used and that the acronyms DFT and FFT can be used interchangeably. The frequency spectrum may further be referred to as an IF signal spectrum, DFT spectrum, or FFT spectrum. Thus, these terms may also be used interchangeably.

As noted above, the test signal $S_{Test}(t)$ is generated by the IQM 109 and is coupled into the receive path by the directional coupler 106, which transmits the test signal $S_{Test}(t)$ towards the mixer 104. The IQM 109 is configured to receive the LO signal $S_{LO}(t)$ as a reference signal and an IQM control signal 114 from the monitoring controller 113. During test mode, the monitoring controller 113 may generate the IQM control signal 114 to enable the IQM 109 and to provide the test offset frequency Foffset to the IQM 109 that is to be applied to the reference signal to generate the test signal $S_{Test}(t)$ having test frequency that is offset from the frequency of the reference signal by the test offset frequency Foffset.

For the test mode, the monitoring controller 113 is also configured to generate control signals 115 and 116. Control signal 115 is configured to enable or disable the transmitter 2. During test mode, the transmitter 2 is disabled by the control signal 115 such that the receive path of the radar MIMIC 200 does not receive radar signals (i.e., radar echoes) originating from the radar MIMIC 200. During a radar operation outside of test mode, the transmitter 2 is enabled and the IQM 109 is disabled. Thus, the control signal 115 is used to control the state of the transmitter 2 based on the operation mode.

Control signal 116 is used to set the local oscillator 101 into either radar operation mode or test mode. During radar operation mode, the local oscillator 101 generates the LO signal $S_{LO}(t)$ to have a series or frequency chirps. In contrast, in test mode, the local oscillator 101 is configured to generate the LO signal $S_{LO}(t)$ to have a constant frequency. Thus, since the IQM 109 uses the LO signal $S_{LO}(t)$ to generate the test signal $S_{Test}(t)$, the test signal $S_{Test}(t)$ also has a constant frequency shifted from the constant frequency of the LO signal $S_{LO}(t)$ by the test offset frequency Foffset. The control signal 116 can also include frequency configuration information used to set the frequency of the LO signal $S_{LO}(t)$.

A DFT is performed on the overall signal (including interference, if present) and conclusions on the results of the monitoring are based on the presence of interference and on comparing a number of subsequent (re-triggered) monitoring sessions. Specifically, the DSP 111 applies a DFT to the digital signal Y(k). The frequency spectrum (i.e., the DFT/FFT spectrum) generated by the DSP 111 may be similar to that shown in FIG. 6A if no interfering signal $z_{RF}(t)$ is present or may be similar to that shown in FIG. 6B if an interfering signal $z_{RF}(t)$ is present and superimposed onto the test signal $S_{Test}(t)$.

The DFT spectrum analyzer 112 is a processor that analyzes the frequency spectrum of the digital signal Y(k) and determines whether the SNR of the digital signal Y(k) has been degraded. In other words, the DFT spectrum analyzer 112 determines whether the measured SNR deviates by more than a threshold amount from an expected SNR (i.e., a reference SNR). In this way, by analyzing the frequency spectrum of the digital signal Y(k) that represents the monitoring signal through the receive path, the DFT spectrum analyzer 112 determines the quality of the RX monitoring signal and whether or not the injected test signal $S_{Test}(t)$ has been compromised by an interfering signal $z_{RF}(t)$. That is, it determines whether the quality of the digital signal Y(k) satisfies a predetermined criteria.

If the quality is too low, then the test signal has been compromised and should be disregarded as unreliable (i.e., not used for the monitoring operation). If the quality is sufficient, then the RX monitoring signal is accepted as a reliable test signal and its data can be used for the monitoring operation. If the test signal is deemed reliable, the DFT spectrum analyzer 112 may further analyze the test signal to determine whether the receive path is in a functional safe operating mode or in a functional unsafe operating mode. In response to determining that the receive path is in the functional unsafe operating mode, the DFT spectrum analyzer 112 may be configured to generate a fault signal and transmit the fault signal to an external device, such as to system controller 50. Additionally, or alternatively, in response to determining that the receive path is in the functional unsafe operating mode, the DFT spectrum analyzer 112 may be configured to trigger a further test signal either internally or externally. For example, a further internal test signal may be triggered by the monitoring controller 113 or a further external test signal may be injected into the receive path by the system controller 50.

The quality of the digital signal Y(k), which directly corresponds to the quality of the test signal $S_{Test}(t)$ output by the coupler 106, indicated whether the signal strength indicator of the test signal in the expected frequency range compared to other frequency ranges is within an acceptable range, whether its SNR is withing an acceptable range, and the like.

One way to measure the quality of the RX monitoring signal is to measure the SNR directly and compare the measured SNR with the reference SNR. For example, the isolated power of the continuous-wave tone is measured by evaluating the tone at a corresponding DFT bin. In case there is no significant measured variation on the power of the continuous-wave monitoring signal DFT bin, any other deviation showing up in aggregate power measurements will be attributed to increase noise, i.e. decreased SNR, by an interfering signal. The power of the signal can be either computed from the spectrum or the time domain signal directly. If this power ratio exceeds a certain preconfigurable threshold, interference may have occurred in this dedicated monitoring time slot.

In response to determining that the quality of the RX monitoring signal is below a predetermined threshold (e.g., that the measured SNR is below a predetermined SNR threshold or that a difference between the measured SNR and a reference SNR exceeds a predetermined delta threshold), the DFT spectrum analyzer 112 determines that an interfering signal is present. Thus, in response to determining that the quality of the RX monitoring signal is too low, the DFT spectrum analyzer 112 transmits a trigger signal 117 to the monitoring controller 113 to re-trigger the monitoring operation.

In response to receiving the trigger signal 117, the monitoring controller 113 may re-trigger monitoring operation by disabling the transmitter 2 via control signal 115, enabling the IQM 109 via control signal 114, and setting the local oscillator 101 into test mode by instructing it to set the LO signal $S_{LO}(t)$ to a constant frequency via control signal 116. Thus, the test signal $S_{Test}(t)$ is retriggered (repeated) and the analysis starts over.

Since it is unlikely that interference occurs over multiple consecutive monitoring time slots, the RX monitoring may be re-triggered (repeated) only a few times in order to get a valid monitoring result. In case the monitoring error persists, a proper safety reaction needs to be triggered on system level. For example, the monitoring controller 113 may include a counter to count the number of consecutive trigger signals 117 that are received from consecutive monitoring operations. Each time the trigger signal 117 is received, the counter value of the counter is incremented. If the incremented counter value of the counter is less than a counter threshold value, the monitoring controller 113 may repeat the test operation by retriggering the test signal $S_{Test}(t)$ at the same frequency and power. If the incremented counter value of the counter meets or exceeds the counter threshold value, a fault may be signaled by the monitoring controller 113.

Specifically, if the number of consecutive trigger signals 117 indicating a degraded RX monitoring signal equals or exceeds a predetermined threshold N (e.g., N is equal to 2 or more), then the monitoring controller 113 may determine that a fault within the MMIC 200 may be causing the degraded RX monitoring signal rather than interfering signals. In this case, the monitoring controller 113 may generate a fault signal and/or trigger additional testing of the MMIC 200 to isolate the fault. The monitoring controller 113 may also determine the cause of the fault. The monitoring controller 113 may also be configured to not retrigger a further test signals when the counter threshold value is met or exceeded.

In the above context, "retriggering" a test signal means that a test signal is regenerated or repeated to have the same frequency and the same power as other test signals that came before it during a same test operation. New test operations may also be triggered by the monitoring controller 113 in a way that the test signal is reconfigured or modified to be different in at least one of frequency or power when compared to a test signal generated in a previous test operation. For example, if the number of consecutive trigger signals 117 indicating a degraded RX monitoring signal equals or exceeds a predetermined threshold N (e.g., N is equal to 2 or more), then the monitoring controller 113 may trigger a new test operation during which it modifies the test signal to have at least a different frequency or different power used in a previous test operation.

When triggering a new, second test operation, the monitoring controller 113 may transmit a control signal 116 that includes reconfiguration information for setting the frequency and/or the power of the local oscillator 101 to a different value. Additionally, or alternatively, when triggering a new test operation, the monitoring controller 113 may transmit a control signal 114 that includes reconfiguration information for setting the frequency offset of the IQM 109 to a different value. Thus, the test signal $S_{Test}(t)$ injected into the RX channel will have a different constant frequency than the test signal $S_{Test}(t)$ generated during the previous test operation. By injecting a test signal with different frequency components, the monitoring controller 113 may be able to further evaluate the RX channel. Of course, the transmitter 2 is also disabled during any test operation via control signal 115. The modified test signal may then be evaluated in a similar manner described above with the counter of the monitoring controller 113 reset to zero and incremented each time trigger signal 117 is received.

In addition, if the test signal is deemed reliable, the DFT spectrum analyzer 112 may transmit a reset signal 118 to the monitoring controller 113 to reset the counter value to zero.

Additional embodiments are provided below:

1. A radio frequency (RF) circuit, comprising:
an input terminal configured to receive a reception signal;
an output terminal configured to output a digital output signal;
a receive path coupled to and between the input terminal and the output terminal, wherein the receive path includes analog portion and a digital portion;
a local oscillator configured to generate a reference signal;
a test signal generator configured to receive the reference signal and generate a test signal that has a constant frequency offset from the reference signal;
a directional coupler configured to couple the test signal into the analog portion of the receive path;
a mixer configured to receive the test signal coupled into the receive path and the reference signal from the local oscillator, and generate a mixer output signal having a test frequency equal to the constant frequency offset;
a front end signal processing circuit comprising an analog-to-digital converter (ADC) configured to convert the mixer output signal into a digital test signal; and
a digital processor configured to receive the digital test signal from the digital portion of the receive path, analyze a frequency spectrum of the digital test signal, and determine whether the quality of the digital test signal satisfies a predetermined criteria, wherein on a first condition that the quality of the digital test signal does not satisfy the predetermined criteria, the digital processor generates a trigger signal to retrigger the test signal.

2. The RF circuit of embodiment 1, wherein:
on a second condition that the quality of the digital signal satisfies the predetermined criteria, the digital processor determines that test data extracted from the digital signal is reliable.

3. The RF circuit of embodiment 2, wherein the digital processor is configured to determine that the quality of the digital test signal does not satisfy the predetermined criteria when a signal-to-noise ratio (SNR) of the digital test signal is less than a predetermined threshold.

4. The RF circuit of embodiment 1, further comprising:
a monitoring controller configured to receive the trigger signal from the digital processor, increment a counter value of a counter in response to receiving the trigger signal, and compare the incremented counter value to a counter threshold value that has a value greater 1;
on a condition that the incremented counter value is less than the counter threshold value, the monitoring controller is configured to perform a test operation in response to the trigger signal, wherein, to perform the test operation, the monitoring controller is configured to transmit a first control signal to the test signal generator to retrigger the analog test signal; and
on a condition that the incremented counter value is equal to or greater than the counter threshold value, the monitoring controller is configured to generate a fault signal.

5. The RF circuit of embodiment 1, wherein:
the local oscillator is configurable in a radar operation mode, during which the reference signal is a frequency-modulated continuous-wave (FMCW) signal, and a test operation mode, during which the reference signal is a continuous-wave signal having a constant frequency, and
the test signal generator is configured to generate the analog test signal during test operation mode.

In view of the above, the MMIC is configured to detect when a safety-critical monitoring measurement is affected by interference. This avoids shutting down the MMIC 200 or a portion thereof before interference is ruled out as a cause of a degraded RX monitoring signal. The monitoring is retriggered subsequent time slots, and the identification of temporary interference affecting otherwise anomaly-free monitoring results.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized, and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A radio frequency (RF) circuit, comprising:
   an input terminal configured to receive a reception signal from an antenna;
   an output terminal configured to output a digital output signal;
   a receive path comprising a mixer and an analog-to-digital converter (ADC), wherein the receive path is coupled to and between the input terminal and the output terminal, wherein the receive path includes an analog portion and a digital portion, and wherein the ADC generates a digital signal based on an analog signal received from the analog portion;
   a test signal generator configured to generate an analog test signal that is injected into the analog portion of the receive path; and
   a digital processor configured to:
      receive a digital test signal from the digital portion of the receive path, the digital test signal being derived from the analog test signal, analyze a frequency spectrum of the digital test signal, and determine a quality of the digital test signal;
      determine whether the quality of the digital test signal satisfies a predetermined criteria; and
      generate, based on a first condition that the quality of the digital test signal does not satisfy the predetermined criteria, a trigger signal to retrigger the analog test signal.

2. The RF circuit of claim 1, wherein the frequency spectrum is a Discrete Fourier transform (DFT) spectrum.

3. The RF circuit of claim 1, wherein the digital processor is configured to determine that the quality of the digital test signal does not satisfy the predetermined criteria when a signal-to-noise ratio (SNR) of the digital test signal is less than a predetermined threshold.

4. The RF circuit of claim 1, wherein the digital processor analyzes the frequency spectrum of the digital test signal by measuring a signal-to-noise ratio (SNR) of the digital test signal and comparing the measured SNR to a predetermined threshold, and
   wherein the digital processor is configured to determine that the quality of the digital test signal does not satisfy the predetermined criteria when the SNR is less than the predetermined threshold.

5. The RF circuit of claim 1, wherein:
   the digital processor analyzes the frequency spectrum of the digital test signal by measuring a signal-to-noise ratio (SNR) of the digital test signal, calculating a SNR difference between a reference SNR and the measured SNR, and comparing the SNR difference to a predetermined threshold, and
   the digital processor is configured to determine that the quality of the digital test signal does not satisfy the predetermined criteria when the SNR difference exceeds the predetermined threshold.

6. The RF circuit of claim 1, further comprising:
   a monitoring controller configured to receive the trigger signal from the digital processor, and perform a test operation in response to the trigger signal,
      wherein, to perform the test operation, the monitoring controller is configured to transmit a first control signal to the test signal generator to retrigger the analog test signal.

7. The RF circuit of claim 6, further comprising:
   a transmitter configured to transmit a frequency-modulated continuous-wave (FMCW) signal during a radar operation,
      wherein, to perform the test operation, the monitoring controller is configured to transmit a second control signal to the transmitter to disable the transmitter from transmitting the FMCW signal during the test operation.

8. The RF circuit of claim 1, further comprising:
   a monitoring controller configured to receive the trigger signal from the digital processor, increment a counter value of a counter in response to receiving the trigger signal, and compare the incremented counter value to a counter threshold value that has a value greater than 1,
      wherein on a condition that the incremented counter value is less than the counter threshold value, the monitoring controller is configured to perform a test operation in response to the trigger signal, wherein, to perform the test operation, the monitoring controller is configured to transmit a first control signal to the test signal generator to retrigger the analog test signal, and wherein on a condition that the incremented counter value is equal to or greater than the counter threshold value, the monitoring controller is configured to generate a fault signal.

9. The RF circuit of claim 1, further comprising:

a monitoring controller configured to receive the trigger signal from the digital processor, increment a counter value of a counter in response to receiving the trigger signal, and compare the incremented counter value to a counter threshold value that has a value greater than 1, wherein, on a condition that the incremented counter value is less than the counter threshold value, the monitoring controller is configured to repeat a first test operation in response to the trigger signal, wherein, to repeat the first test operation, the monitoring controller is configured to transmit a first control signal to the test signal generator to retrigger the analog test signal, wherein, on a condition that the incremented counter value is equal to or greater than the counter threshold value, the monitoring controller is configured to transmit a second control signal to the test signal generator to initialize a second test operation, wherein the second control signal includes reconfiguration information that modifies at least one of a frequency or a power of the analog test signal, and wherein the test signal generator is configured to generate, during the second test operation, the analog test signal having at least one of the modified frequency or the modified power.

10. The RF circuit of claim 1, further comprising:

a local oscillator configured to generate a reference signal; and a directional coupler configured to couple the analog test signal into the analog portion of the receive path, wherein the test signal generator is configured to receive the reference signal and generate the analog test signal that comprises at least one constant frequency each being offset from the reference signal, and wherein the mixer is configured to receive the analog test signal coupled into the receive path and the reference signal from the local oscillator, and generate a mixer output signal having a test frequency comprising at least one frequency offset, wherein the digital test signal is derived from the mixer output signal.

11. The RF circuit of claim 10, wherein the local oscillator is configurable in a radar operation mode, during which the reference signal is a frequency-modulated continuous-wave (FMCW) signal, and a test operation mode, during which the reference signal is a continuous-wave signal having the at least one constant frequency, and wherein the test signal generator is configured to generate the analog test signal during test operation mode.

12. The RF circuit of claim 1, wherein on a second condition that the quality of the digital test signal satisfies the predetermined criteria, the digital processor determines that test data extracted from the digital test signal is reliable.

13. The RF circuit of claim 12, wherein on the second condition, the digital processor is configured to analyze the digital test signal and to determine whether the receive path is in a functional safe operating mode or in a functional unsafe operating mode.

14. The RF circuit of claim 13, wherein, in response to determining that the receive path is in the functional unsafe operating mode, the digital processor is configured to generate a fault signal and transmit the fault signal to an external device.

15. The RF circuit of claim 13, wherein, in response to determining that the receive path is in the functional unsafe operating mode, the digital processor is configured to trigger a further test signal.

16. The RF circuit of claim 1, wherein a reference signal and the analog test signal are continuous-wave RF signals.

17. The RF circuit of claim 1, wherein the test signal generator is an IQ modulator configured to receive a reference signal and generate the analog test signal that has at least one constant frequency offset from the reference signal.

18. A method of performing reception monitoring in a radio frequency (RF) circuit, the method comprising:

generating a reference signal;

generating an analog test signal that comprises a constant frequency offset from the reference signal;

injecting the analog test signal into an analog portion of a receive path;

generating a mixer output signal based on the analog test signal coupled into the receive path and the reference signal, wherein the mixer output signal comprises a test frequency equal to the constant frequency offset;

converting the mixer output signal into a digital test signal;

analyzing a frequency spectrum of the digital test signal to determine whether a quality of the digital test signal satisfies a predetermined criteria; and generating, based on a first condition that the quality of the digital test signal does not satisfy the predetermined criteria, a trigger signal to retrigger the analog test signal.

19. The method of claim 18, wherein analyzing the frequency spectrum of the digital test signal to determine whether the quality of the digital test signal satisfies the predetermined criteria includes:

determining that the quality of the digital test signal does not satisfy the predetermined criteria when a signal-to-noise ratio (SNR) of the digital test signal is less than a predetermined threshold.

20. The method of claim 18, wherein, in response to the trigger signal, performing a test operation, including retriggering the analog test signal and controlling an RF transmitter to disable a transmission of a frequency-modulated continuous-wave (FMCW) signal during the test operation.

21. The method of claim 18, further comprising:

in response to the trigger signal, incrementing a counter value of a counter and comparing the incremented counter value to a counter threshold value that has a value greater than 1, wherein on a condition that the incremented counter value is less than the counter threshold value, performing a test operation including retriggering the analog test signal, and wherein on a condition that the incremented counter value is equal to or greater than the counter threshold value, generating a fault signal.

22. The method of claim 18, further comprising:

operating in radar mode during which the reference signal is a frequency-modulated continuous-wave (FMCW) signal; and operating in test mode during which the reference signal is a continuous-wave signal that comprises a constant frequency, and the analog test signal is generated and injected into the analog portion of the receive path.

23. The method of claim 18, wherein, on a second condition that the quality of the digital test signal satisfies the predetermined criteria, determining that test data extracted from the digital test signal is reliable.

* * * * *